May 5, 1953  D. M. SCHWARTZ  2,637,443
ROTARY PAN FILTER
Filed Oct. 3, 1947  5 Sheets-Sheet 1
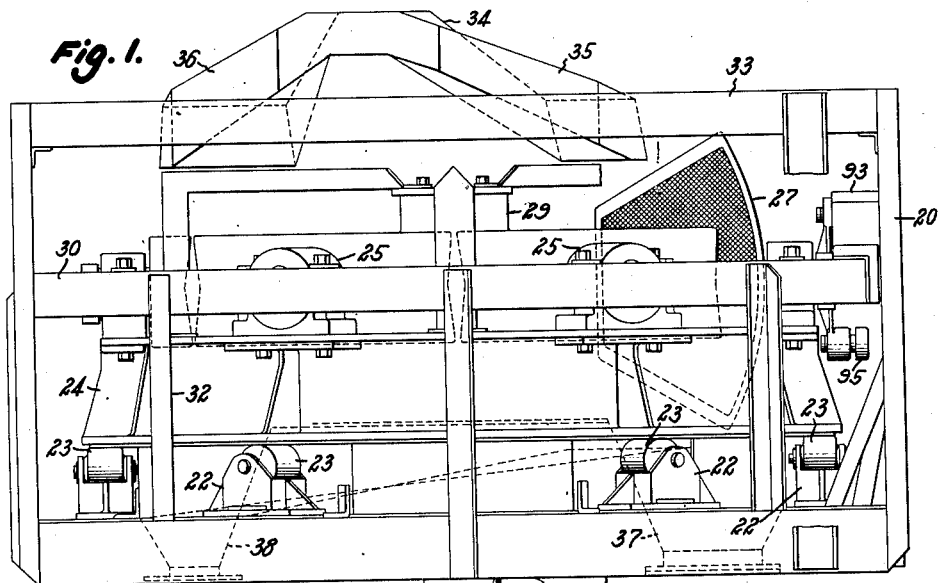
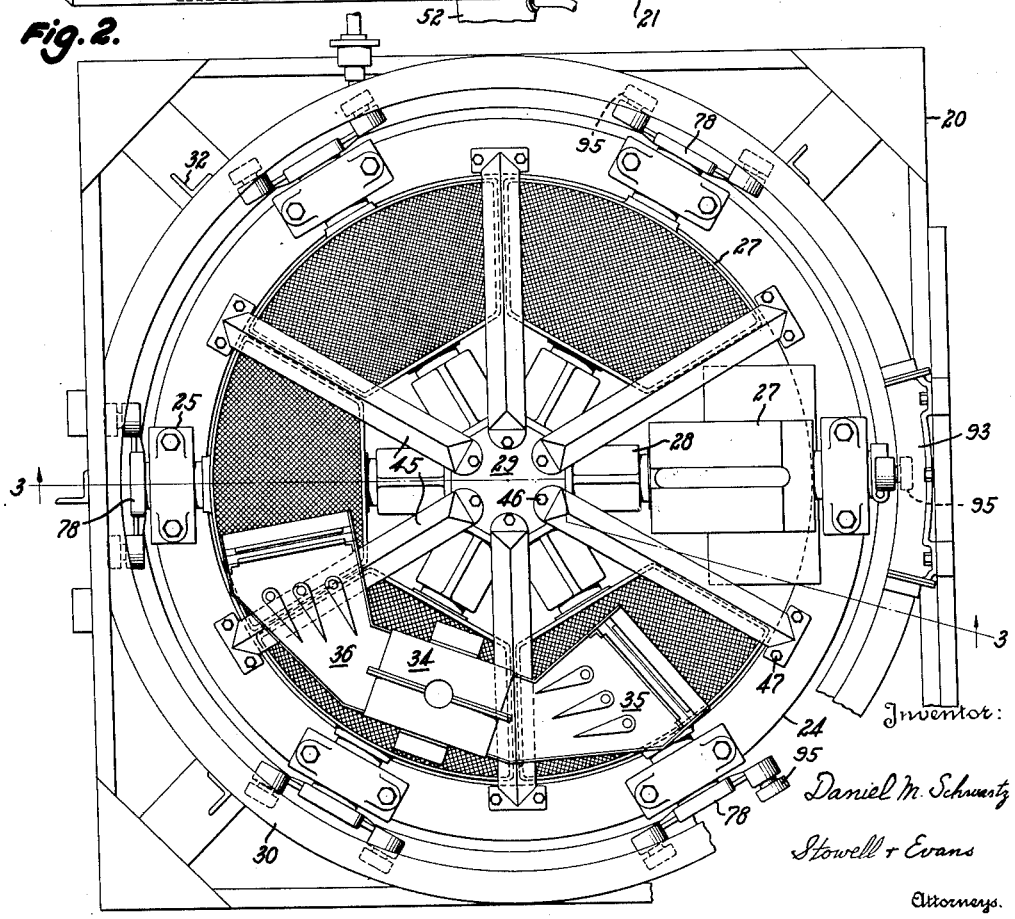
Inventor:
Daniel M. Schwartz
Stowell + Evans
Attorneys.

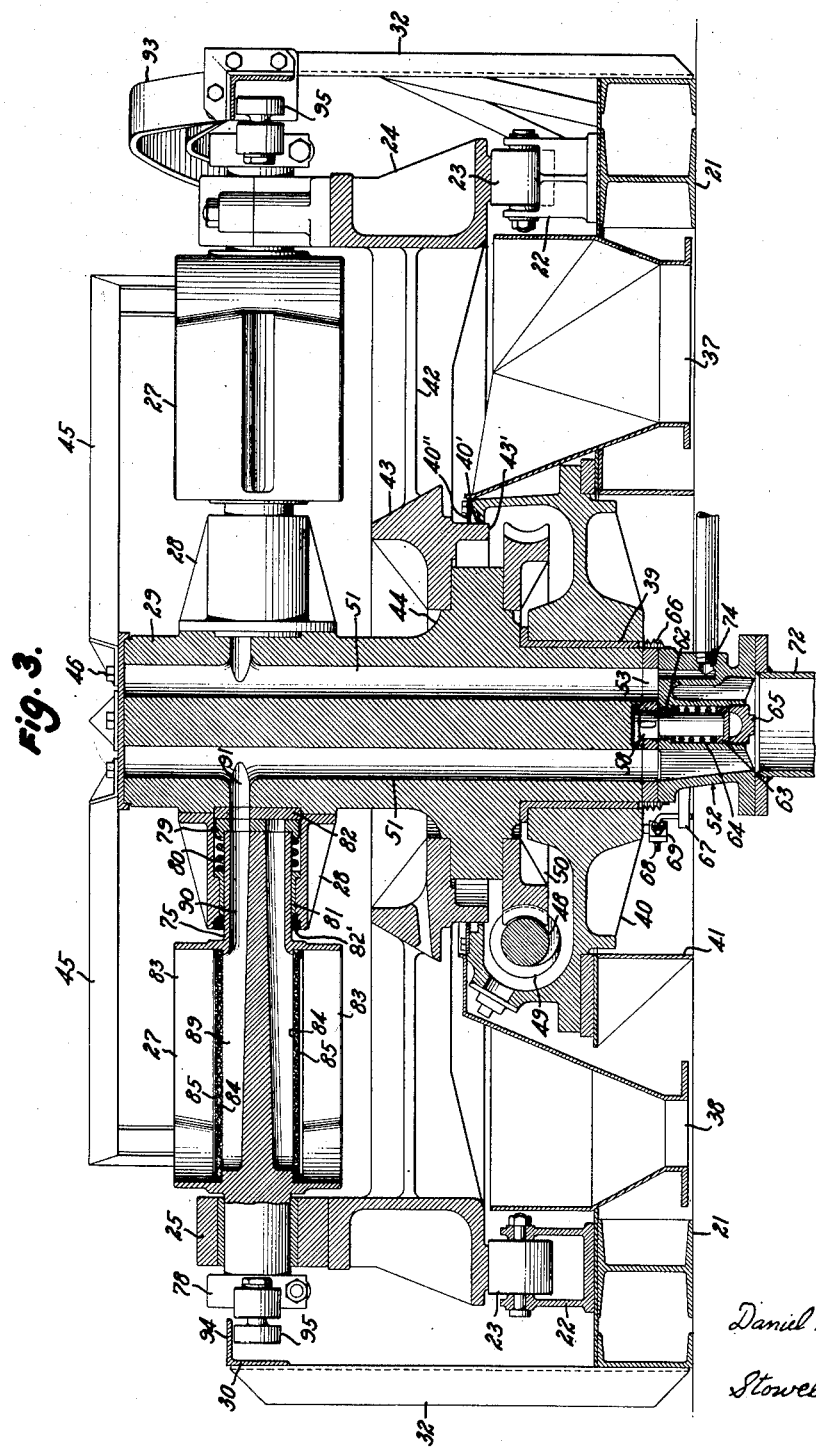

May 5, 1953　　　　　D. M. SCHWARTZ　　　　　2,637,443
ROTARY PAN FILTER
Filed Oct. 3, 1947　　　　　　　　　　　　　　5 Sheets-Sheet 3
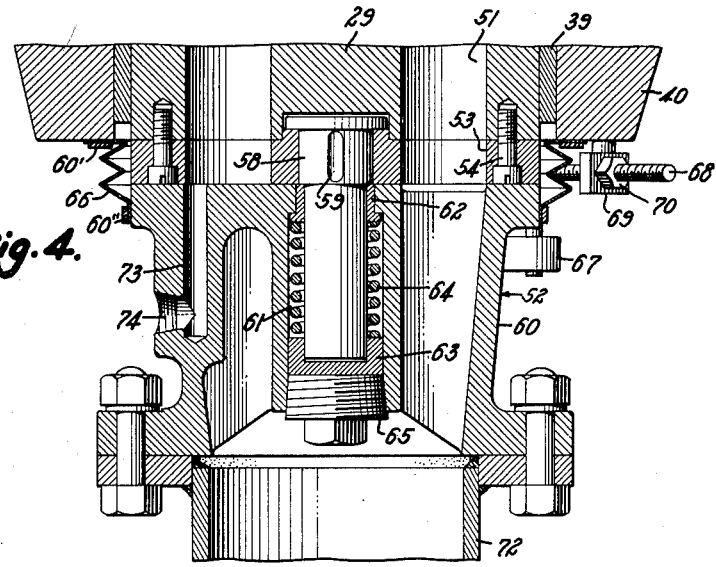
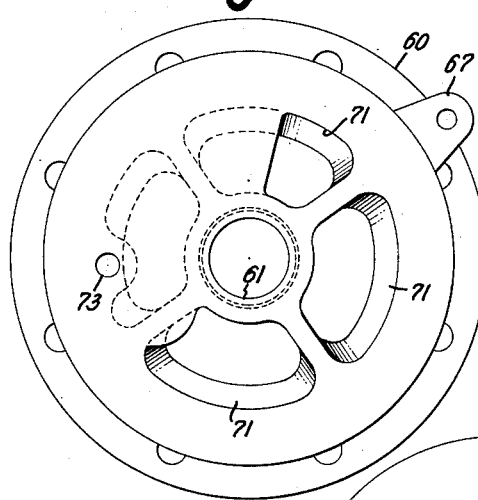
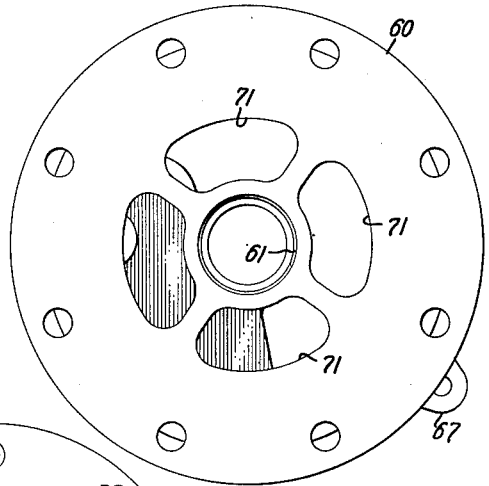
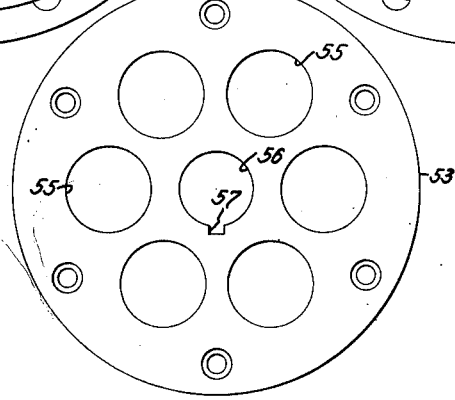
Inventor:
Daniel M. Schwartz
Stowell & Evans
Attorneys.

May 5, 1953  D. M. SCHWARTZ  2,637,443
ROTARY PAN FILTER

Filed Oct. 3, 1947                                              5 Sheets-Sheet 4

Inventor:
Daniel M. Schwartz
By Stowell & Evans
Attorneys.

May 5, 1953        D. M. SCHWARTZ        2,637,443
ROTARY PAN FILTER

Filed Oct. 3, 1947        5 Sheets-Sheet 5

Inventor:
Daniel M. Schwartz
Stowell & Evans
Attorneys.

Patented May 5, 1953

2,637,443

UNITED STATES PATENT OFFICE 2,637,443

ROTARY PAN FILTER

Daniel M. Schwartz, Salt Lake City, Utah, assignor to The Eimco Corporation, Salt Lake City, Utah, a corporation of Utah Application October 3, 1947, Serial No. 777,829

12 Claims. (Cl. 210—202.5)

This invention relates to filters and more particularly to those of the type known as rotary pan filters.

An object of the invention is to provide a rotary pan filter of improved construction having a plurality of horizontally disposed circumferentially arranged filter pans, the pans being inverted to discharge their cakes. The pans have filtering areas on both sides that may be used alternately so that while the upper cell of the pan is employed for filtering, the lower cell is being cleaned.

Another object is to provide a rotary pan filter wherein the construction and arrangement of valves for providing suction and pressure is sturdy and free from delicate parts that ordinarily are the source of much operating difficulty. The pan valve provides a tight fit and is compensated for wear. The main valve is of rugged construction and is mounted on the filter in a manner to eliminate undesirable strains while maintaining a tight sealing relation to the rotating parts of the filter. Adjustment of the main valve is easy to make. Also, the main valve construction employs an effective dust boot, grease retainer and sealing device.

Still another object is to provide in a filter of the type described a pan construction that permits close circumferential disposition of the pans while permitting the pans to be inverted without interfering with each other.

Yet another object is to provide a rotary pan filter having a driving gear and mounting that permits ready assembly and disassembly of the apparatus and makes inspection and replacement and adjustment of parts easy to accomplish.

A further object is to provide in the filter of the invention automatic means for inverting the filter pans at the proper point in the filtering cycle.

The filter of the invention includes a vertical column having a plurality of channels and mounted for rotation about a vertical axis; a plurality of horizontally disposed filter pans arranged circumferentially about said column for rotation therewith and supported for rotation about a horizontal axis radial to said column, said filter pans including symmetrically disposed filter cells and separate channels leading from each cell; valve means between each of said filter pans and said column to effect communication between one of the channels in said column and alternate channels of one of said filter pans as said filter pans rotate about said horizontal axis; second valve means coacting with the channels of said vertical column to place said channels in communication with fluid pump means during predetermined portions of the period of revolution of the column about its vertical axis; means for rotating said column and associated filter pans about said vertical axis; and means for successively rotating said filter pans about the radial horizontal axes thereof at a predetermined sector in the revolution of said column-filter pan assembly about said vertical axis.

The invention will be set forth with greater particularity in the following detailed description of a preferred embodiment thereof as shown in the accompanying drawings in which:

Fig. 1 is an elevational view of a rotary pan filter embodying the principles of the invention;

Fig. 2 is a plan view of the filter shown in Fig. 1;

Fig. 3 is an enlarged vertical sectional view taken substantially along the plane of the line 3—3 of Fig. 2;

Fig. 4 is a still further enlarged detail sectional view of the main valve and associated parts of the filter taken at opposite hand to the view of Fig. 3;

Fig. 5 is a plan view of the main valve block shown on the same scale as Fig. 4;

Fig. 6 is a bottom view of the valve block of Fig. 5;

Fig. 7 is a bottom view of the main valve wear plate on the same scale as Fig. 4;

Figure 8:
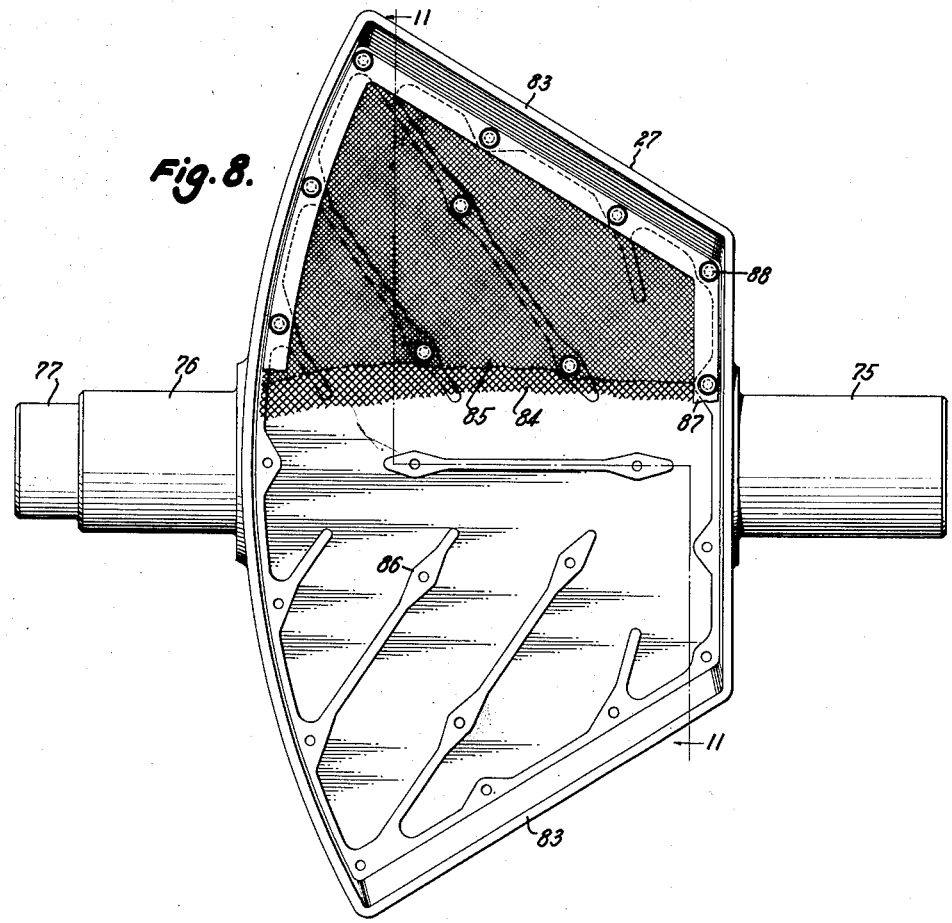
Fig. 8 is an enlarged plan view of one of the filter pans, parts being broken away to show interior construction.
Figure 9:
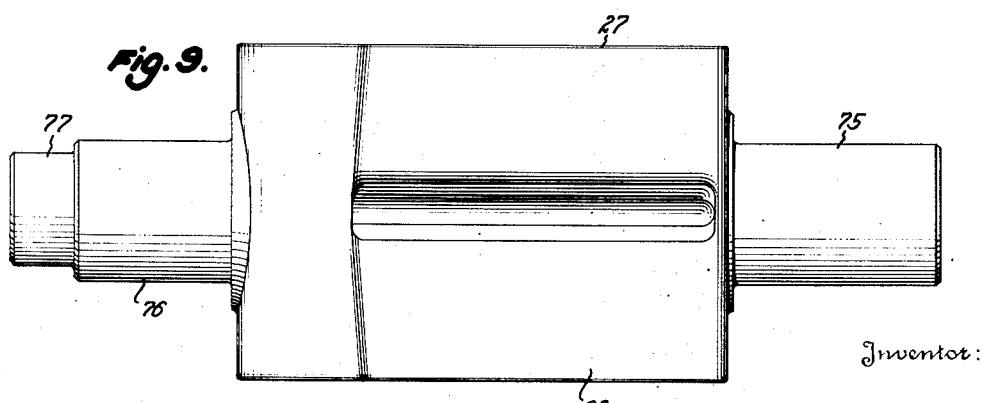
Fig. 9 is an elevational view of the pan shown in Fig. 8.
Figure 10:
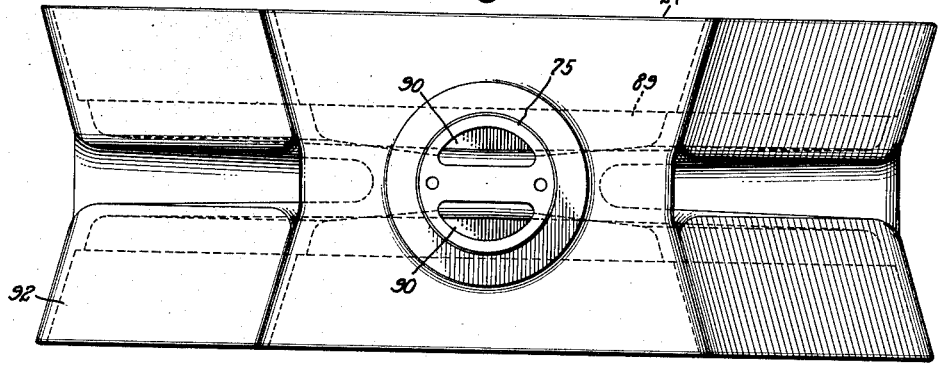
Fig. 10 is a right side view of the pan.
Figure 11:
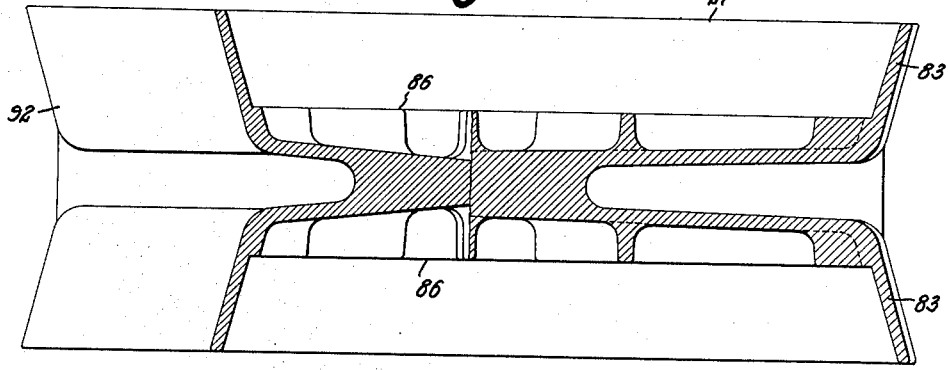
Fig. 11 is a sectional view taken along the plane of the line 11—11 of Fig. 8.

In the following detailed description of the illustrated embodiment, additional objects and advantages of the invention will be in part apparent and part pointed out.

Referring now to the drawings, in which like reference numerals in the several views refer to corresponding parts, the filter illustrated generally in Figs. 1 and 2 has a frame 20, the bed 21 of which carries brackets 22 mounting a plurality of horizontal rollers 23. The rollers 23 are circularly arranged and support thereon a ring or spider 24 for rotation about the vertical axis of the ring. A plurality of bearing blocks 25 are mounted on the top of the ring, and these in turn support the radially outer ends of filter pans 27, the inner ends of which are carried in bearings 28 mounted on a central column 29. The column, as will appear more fully hereinafter, is mounted in a main bearing for rotation about its vertical axis and the ring 24 is united to the column by structural members for rotation therewith.

A circular track 30, the purpose of which will be described more particularly hereinafter, is also supported by the frame bed 21 on uprights 32. The frame provides a superstructure 33 carrying the feed-box 34 and sluiceways 35 and 36.

A hopper 37 for receiving filter cake and another hopper 38 for discharge of washings are shown in dotted lines in Fig. 1.

Referring now to Fig. 3, the central column 29 is mounted in a main sleeve bearing 39 supported in the worm gear box or housing 40 carried in turn by the frame member 41. It will be seen that the spider 24 is connected by integral radial structural arms 42 to the hub 43 which is bolted or otherwise suitably joined to the collar 44 forming a part of the central column 29.

Power for rotating the filter is supplied to worm shaft 48 from a power source (not shown) and transmitted from the worm 49 to the worm wheel 50 that is bolted or otherwise affixed to the underside of the collar 44.

The hub 43 is removably secured to the collar 44, as by screws (not shown) and has a depending cylindrical skirt portion 43' that projects into the circular opening provided by the annular flange 40' of the gear housing 40 and slidingly engages a packing included between the retainer ring 40'', secured to the top of the housing, and the annular flange 43', thus insuring that the interior of the gear housing is properly sealed. It will be noted that the diameter of the opening 40' in the gear housing is slightly greater than the diameter of the worm wheel 50 so that the latter may be conveniently inserted into and removed from the housing.

Central column 29 has a plurality of longitudinal conduits 51, one corresponding to each filter pan, and through these conduits connection is made between the filter pans and the main valve assembly, generally designated 52.

The main valve assembly will be described with particular reference to Figs. 4 through 7.

As best seen in Fig. 4, the central column is provided at the bottom with a combined wear plate and valve block support 53 that is secured to the column by screws 54. As shown in bottom view in Fig. 7, the plate 53 has a plurality of holes or column ports 55 that register with the conduits 51 in the column when the plate is bolted in place. The plate also has a central hole 56 provided with a keyway 57 and through this hole depends the valve shaft 58, the shaft being keyed to the plate 53 by means of a key (not shown) inserted in the socket 59 and engaging the keyway 57.

Valve block 60 has a central cylindrical chamber 61 into which the valve shaft 58 depends. The top opening of the chamber is fitted with a bushing 62 in which the shaft 58 rotates. A combination bushing and spring retainer 63 is fastened to the bottom of the valve shaft and rotates in the chamber 61 engaging the interior walls thereof. Compressed between the bushing 62 and the spring retainer 63 is a spring 64 which presses the bushing 62 and the valve block into tight sliding engagement with the wear plate 53. The bottom opening of the chamber 61 is closed by a pipe plug 65 which serves to retain grease within the chamber and to protect the interior of the chamber from filtrate.

A dust boot 66 is fastened between the worm gear housing 40 and the valve block 60, both of which remain stationary in operation, to seal the main bearing 39 and protect the seat between the valve block and the wear plate 53. The boot may take the form of a bellows, preferably made of rubberized fabric, and is secured to the gear housing 40 by a ring 60' and to the main valve block by a retaining band 60''.

The valve block is prevented from rotating with the central column 29 by connecting it through an adjustable connection to the worm gear housing 40. Such connection includes the arm 67, cast integrally with the block; the angle arm 68, provided with screw threads on its horizontal portion; and the bracket 69 secured to the housing 40, through which the horizontal portion of the arm projects. A nut 70 retains the angle arm 68 in position in the bracket 69, and by adjusting the position of the nut on the arm, it will be seen that the angular relationship of the valve block to the gear housing may be varied within certain limits.

The valve block is provided with suction passages 71 extending through the block and a suction pipe 72 is bolted to the bottom of the block. As will be understood, the suction pipe connects with a conventional evacuator (not shown).

A blow port 73 is provided in the valve block and is connected to a source of compressed air (not shown) through tapped opening 74; or the blow port may be left open to the atmosphere.

An outline of the operation of the main valve will be deferred until the description of the filter pans and their cooperation with the turnover cam have been given.

One of the filter pans 27 is detailed in Figs. 8 through 11. The pan has a radial inner trunnion 75, borne in bearing 28 on the center column, and a radial outer trunnion 76, journalled in bearing 25 carried by the outer ring of the spider 24. The outer trunnion 76 has a reduced end portion 77 to which is attached a reversing lever 78, as shown in Figs. 2 and 3.

Referring to Fig. 3, the inner end of trunnion 75 is provided with a wear plate 79 rigidly fastened to the trunnion, and a spring 80 is compressed between the wear plate 79 and a bushing 81 in the bearing 28. The spring 80 forces the wear plate 79 and the filter pan into sealing engagement with a valve seat 82 carried by the center column. The periphery of the wear plate has clearance within the bearing 28. The bushing 81 supports the inner trunnion 75 and the bearing block 25 supports the outer trunnion, thus giving a two-point bearing support that maintains alignment between the valve seat and the valve port. A sealing ring 82' is received within the outer end of the bearing 28 and engages the trunnion 75 to retain lubricant within the bearing.

Each of the filter pans 27 has an identical filter cell on its top and bottom. The upstanding sides 83 of the cell provide a receiver for a charge of slurry to be filtered. The bottom of the charge receiver is formed of a filter medium consisting of a rigid wire screen 84 overlayed by a piece of filter cloth 85. The screen is supported by ribs 86 and the screen and filter cloth are held in place by a frame 87 fastened to the pan body by cap screws 88.

Each filter cell has an inner chamber 89 connected by a conduit 90 extending through the inner trunnion to a port 91 leading to one of the vertical conduits 51 in the center column. It will be seen from Fig. 3 that while the upper filter cell of each pan is connected to a conduit 51, the lower cell is blanked off from the conduit.

Referring to assembly view of Fig. 2, it will be noted that the radial edges of adjacent filter pans are nearly in contact, thus minimizing spillage of feed material through the spaces between pans. In order to permit a pan to be rotated on its trunnions while adjacent pans remain horizontal, the adjacent radial faces 92 of the pans are sloped inwardly towards the horizontal center line of the pan, as can best be seen in Figs. 10 and 11. It will be seen from Fig. 2 that the angle irons 45, that are bolted to the top of the central column at 46 and to the top of the ring at 47, provide inverted V-shaped baffles overlying the gaps between the filter pans and prevent the feed from flowing through the gaps as they pass under the feed box.

An automatic device is provided for rotating each pan one half of a revolution on its trunnions for each revolution of the center column and spider. Such device includes the turning lever 78, already referred to, and a cooperating track 30 and cam arrangement now to be more particularly described.

Referring to Figs. 1 and 2, it will be seen that the track 30 encompasses the circular assembly of filter pans and includes the segmental turning cam 93 at the pan discharge position. The major arcuate portion of the track includes the horizontal trackway 94 on the underside of which the rollers 95 of the turning levers ride to maintain the turning levers 78, with the pans 27, in a level condition throughout most of their horizontal travel. However, when a pan reaches the turning cam 93, shown in detail in Fig. 12, the leading roller 95 of the turning lever engages the ramp 96 and rides up the ramp thereby rotating the turning lever 78 through one-quarter of a revolution to the full-line position shown in Fig. 12. The letters A, B and C designate phantom-line showings of intermediate positions of the turning lever during its first quarter of a revolution.

Figure 12:
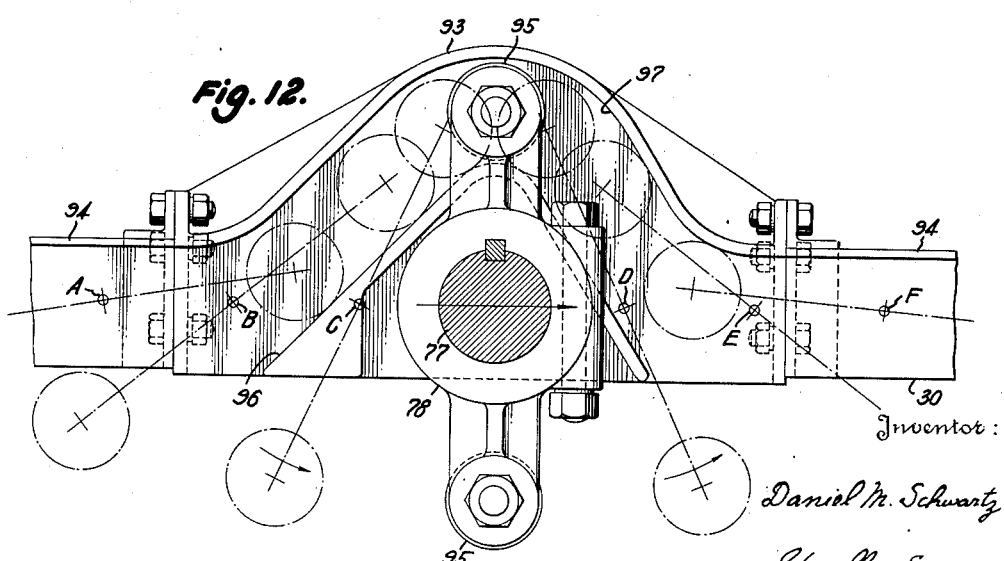
Fig. 12 is an enlarged detail view of the cam for inverting the pans.

In advancing further in the direction of the arrow of Fig. 12, the upper roller 95 encounters the slope 97 of the cam 93 and follows the slope down through the phantom-line positions D, E, and F to the level part 94 of the track 30, thus completing the swinging of the turning lever 78 through one-half of a revolution and inverting the attached pan.

It will be understood that such reversal of the turning levers and pans occurs every time that a pan passes the housing cam 93, and that the pans are turning on their trunnions in the same directional sense each time that they are acted upon by the cam 93.

A typical operating cycle will be described with reference to Figs. 2 and 5. The valve block of Fig. 5 is oriented in the view of Fig. 2 by rotating the former through an angle of 180°. Rotation of the filter is in a clockwise direction. The cycle will be described for a single pan, it being understood that succeeding pans will follow the same cycle with a sixty degree lag.

The cycle will be assumed to start after the suction phase has been completed and the column port of the main valve begins to overlap the blow port 73. The column port and blow port are of such size and so positioned with relation to each other that blowing continues through a 45° rotation of the filter. For the first 5° of the blowing phase, the pan remains horizontal and the cake is raised from the filter cloth and loosened preparatory to dumping. After the first 5°, the turning lever 78 and cam 93 begin to cooperate to invert the pan and such operation continues through an arc of 40°; at this point the pan is completely inverted and the cake has been dumped. Blowing pressure is maintained on the upper or cake-containing cell from the 0° position to the 35° position; and, during the last 10° of filter rotation, as the turning of the pan is being completed, the blowing pressure is shifted by operation of the pan valve 79—82 to the empty cell just coming into upper position.

After the first 45° of filter rotation the column port passes the blow port, and, during the next 60° of travel, the column port is blanked off by a portion of the solid area of the main valve block as seen in Fig. 5. In this sector, the pan passes under sluiceway 35 and the upper cell is filled with filtrand. The blanking off during filling prevents applying suction to the pan until it is completely filled so that air is not drawn through the filter medium reducing suction to the other pans. With materials that are fairly fluid, flowing out freely to cover the bottom of the pan, the blank section may be reduced.

Beginning at 105°, the column port registers with the suction passages 71 in the valve block and suction is applied to the upper cell during substantially the entire balance of the cycle. In the last few degrees of the cycle, the column port is again blanked off by a solid portion of the valve block just prior to registry of the column port and the blow port and the beginning of a new cycle.

Where easily filterable material is being processed, it may be desirable to fill the upper cells twice in each cycle. For this purpose, the sluiceway 36 may be employed in conjunction with a suitably valved feed box.

It will be understood that the cycle just described is merely exemplary and that the several phases of operation may be varied in duration within wide limits by appropriate valve design. Moreover, the blowing phase may be omitted entirely, if desired.

The under cells may be washed preferably by sprays from nozzles (not shown) installed over the hopper 38 and directed at the undersides of the pans.

Although the particular construction of the filter pans, their circumferential arrangement about a central column, their means of support in the apparatus for rotation about a horizontal axis, and their automatic valved connection with the central column are peculiarly advantageous in a filter wherein the entire assembly rotates about a central vertical axis, these filter pan features may be employed to advantage in a filtering apparatus wherein the assembly does not rotate as a whole about a vertical axis and wherein the feeding device rotates with respect to the pans.

The main valve 52 is not essential other than to make rotating connection with the source of vacuum, if blow is not used. Rotation of the pan on its axis would cut off suction at the pan valve and allow the cake to discharge.

The pans need not necessarily be disposed in a circle, but could be in line; for example, either stationary relative to a movable feed or on a belt passing under a feed. Further, specific features such as the valves, drive, etc., are applicable to other filtering apparatus such as horizontal drum or disc filters.

From the foregoing description it will be seen that the present invention provides a pan type filter that is fully automatic in operation and needs only to be supplied with driving power and filtrand and connected to an evacuator. If desired, compressed air for blowing and water for washing the pan cells may also be provided.

I claim:

1. In a filtering apparatus, a vertical column having a plurality of conduits and mounted for rotation about a vertical axis; a plurality of horizontally disposed filter pans arranged circumferentially about said column, means supporting said pans for rotation with said column and for rotation about a horizontal axis radial to said column, said filter pans including symmetrically disposed filter cells and separate channels communicating with each cell; valve means located between each of said filter pans and said column, each valve including means operative in response to rotation on the horizontal axis of the filter pan associated with such valve to effect communication between a certain conduit in said column and successive channels of said filter pan; fluid pump means, second valve means coacting with successive conduits of said vertical column to place said conduits in successive communication with said fluid pump means; means for rotating said column and associated filter pans about said vertical axis; and means for successively rotating said filter pans about the radial horizontal axes thereof at a predetermined sector in the revolution of said column-filter pan assembly about said vertical axis.

2. In a filtering apparatus, a vertical column having a plurality of conduits and mounted for rotation about a vertical axis; a plurality of horizontally disposed filter pans arranged circumferentially about said column, means supporting said pans for rotation with said column and for rotation about a horizontal axis radial to said column, said filter pans including symmetrically disposed filter cells and separate channels communicating with each cell; valve means located between each of said filter pans and said column, each valve including means operative in response to rotation on the horizontal axis of the filter pan associated with such valve to effect communication between a certain conduit in said column and successive channels of said filter pan; said valve means including port means in said column communicating with one of the conduits in said column and a plurality of port means in said pan, each pan port means communicating with one of said pan channels, said pan port means being constructed and arranged to register alternately with said column port means as said filter pan rotates about said horizontal axis; fluid pump means, second valve means coacting with successive conduits of said vertical column to place said conduits in successive communication with said fluid pump means during predetermined portions of the period of revolution of the column about its vertical axis; means for rotating said column and associated filter pans about said vertical axis; and means for successively rotating said filter pans about the radial horizontal axes thereof at a predetermined sector in the revolution of said column-filter pan assembly about said vertical axis.

3. In a filtering apparatus, a vertical column having a plurality of conduits and mounted for rotation about a vertical axis; a plurality of horizontally disposed filter pans arranged circumferentially about said column, means supporting said pans for rotation with said column and for rotation about a horizontal axis radial to said column, said filter pans including symmetrically disposed filter cells and separate channels communicating with each cell; valve means located between each of said filter pans and said column, each valve including means operative in response to rotation on the horizontal axis of the filter pan associated with such valve to effect communication between a certain conduit in said column and successive channels of said filter pan; fluid pump means; second valve means coacting with the conduits of said vertical column to place said conduits in successive communication with said fluid pump means during predetermined portions of the period of revolution of the column about its vertical axis; said second valve means including a relatively stationary valve block in sliding engagement with said vertical column, said valve block having ports communicating with said fluid pump means, and a plurality of port means in said column, each of said column port means communicating with one of said column conduits, said column port means being constructed and arranged to register with said valve block port means during predetermined portions of the period of revolution of the column about its vertical axis; means for rotating said column and associated filter pans about said vertical axis; and means for successively rotating said filter pans about the radial horizontal axes thereof at a predetermined sector in the revolution of said column-filter pan assembly about said vertical axis.

4. In a filtering apparatus, a vertical column having a plurality of conduits and mounted for rotation about a vertical axis; a plurality of horizontally disposed filter pans arranged circumferentially about said column, means supporting said pans for rotation with said column and for rotation about a horizontal axis radial to said column, said filter pans including symmetrically disposed filter cells and separate channels communicating with each cell; valve means located between each of said filter pans and said column, each valve including means operative in response to rotation on the horizontal axis of the filter pan associated with such valve to effect communication between a certain conduit in said column and successive channels of said filter pan; fluid pump means; second valve means coacting with the conduits of said vertical column to place said conduits in successive communication with said fluid pump means during predetermined portions of the period of revolution of the column about its vertical axis; said second valve means including a relatively stationary valve block in sliding engagement with said vertical column, said valve block having a port in communication with a fluid suction device and another port in communication with a fluid pressure device, and a plurality of port means in said column, each of said column port means communicating with one of said column conduits, said column port means being constructed and arranged to register with said valve block port means during predetermined portions of the period of revolution of the column about its vertical axis; means for rotating said column and associated filter pans about said vertical axis; and means for successively rotating said filter pans about the radial horizontal axes thereof at a predetermined sector in the revolution of said column-filter pan assembly about said vertical axis.

5. In a filtering apparatus, a vertical column having a plurality of conduits and mounted for rotation about a vertical axis; a plurality of horizontally disposed filter pans arranged circumferentially about said column, means supporting said pans for rotation with said column and for rotation about a horizontal axis radial to said column, said filter pans including symmetrically disposed filter cells and separate channels communicating with each cell; valve means located between each of said filter pans and said column, each valve including means operative in response to rotation on the horizontal axis of the filter pan associated with such valve to effect communication between a certain conduit in said column and successive channels of said filter pan; fluid pump means; second valve means coacting with the conduits of said vertical column to place said conduits in successive communication with said fluid pump means during predetermined portions of the period of revolution of the column about its vertical axis; said second valve means including a relatively stationary valve block, shaft means on said vertical column in alignment with the vertical axis thereof, bearing means in said valve block journalling said block on said shaft, spring means acting between said valve and said block to bias said block into sliding engagement with said column, said valve block having a port in communication with a fluid suction device and another port in communication with a fluid pressure device, and a plurality of port means in said column, each of said column port means communicating with one of said column conduits, said column port means being constructed and arranged to register with said valve block port means during predetermined portions of the period of revolution of the column about its vertical axis; means for rotating said column and associated filter pans about said vertical axis; and means for successively rotating said filter pans about the radial horizontal axes thereof at a predetermined sector in the revolution of said column-filter pan assembly about said vertical axis.

6. In a filtering apparatus, a vertical column having a plurality of conduits and mounted for rotation about a vertical axis; a plurality of horizontally disposed filter pans arranged circumferentially about said column, means supporting said pans for rotation with said column and for rotation about a horizontal axis radial to said column, said filter pans including symmetrically disposed filter cells and separate channels communicating with each cell; valve means located between each of said filter pans and said column, each valve including means operative in response to rotation on the horizontal axis of the filter pan associated with such valve to effect communication between a certain conduit in said column and successive channels of said filter pan; fluid pump means; second valve means coacting with successive conduits of said vertical column to place said conduits in successive communication with said fluid pump means during predetermined portions of the period of revolution of the column about its vertical axis; means for rotating said column and associated filter pans about said vertical axis; and means including a pair of divergent arms carried by each of said filter pans, a track continuously engaged by said arms, and a cam in said track for successively rotating said filter pans about the radial horizontal axes thereof at a predetermined sector in the revolution of said column-filter pan assembly about said vertical axis.

7. In a filtering apparatus, a vertical column having a plurality of conduits and mounted for rotation about a vertical axis; a plurality of horizontally disposed filter pans arranged circumferentially about said column, means supporting said pans for rotation with said column and for rotation about a horizontal axis radial to said column, said filter pans including symmetrically disposed filter cells and separate channels communicating with each cell; valve means located between each of said filter pans and said column, each valve including means operative in response to rotation on the horizontal axis of the filter pan associated with such valve to effect communication between a certain conduit in said column and successive channels of said filter pan; fluid pump means; second valve means coacting with successive conduits of said vertical column to place said conduits in successive communication with said fluid pump means during predetermined portions of the period of revolution of the column about its vertical axis; means for rotating said column and associated filter pans about said vertical axis; said rotating means including a worm wheel carried by said vertical column, a worm coacting with said worm wheel, and a housing for said worm gearing having a circular opening of larger diameter than said worm wheel and through which said worm wheel may be inserted into and removed from said housing; and means for successively rotating said filter pans about the radial horizontal axes thereof at a predetermined sector in the revolution of said column-filter pan assembly about said vertical axis.

8. In a filtering apparatus, a vertical column having a plurality of conduits and mounted for rotation about a vertical axis; a plurality of horizontally disposed filter pans arranged circumferentially about said column, means supporting said pans for rotation with said column and for rotation about a horizontal axis radial to said column, said filter pans having a filter cell on the upper face and a filter cell on the lower face thereof and separate channels communicating with each cell; valve means located between each of said filter pans and said column, each valve including means operative in response to rotation on the horizontal axis of the filter pan associated with such valve to effect communication between a certain conduit in said column and successive channels of said filter pan; fluid pump means; second valve means coacting with successive conduits of said vertical column to place said conduits in successive communication with said fluid pump means during predetermined portions of the period of revolution of the column about its vertical axis; means for rotating said column and associated filter pans about said vertical axis; and means for successively rotating said filter pans about the radial horizontal axes thereof at a predetermined sector in the revolution of said column-filter pan assembly about said vertical axis.

9. In a filtering apparatus, a plurality of horizontally disposed filter pans supported for rotation about their horizontal axes, the outside adjacent face surfaces of said filter pans being of concave form to allow rotation of the adjacent pans and to allow the adjacent edges of the pans to be nearly in contact to minimize the gap between the pans.

10. In a filtering apparatus, a vertical column having a plurality of conduits and mounted for rotation about a vertical axis; a plurality of horizontally disposed filter pans arranged circumferentially about said column, means supporting said pans for rotation with said column and for rotation about a horizontal axis radial to said column, said filter pans including symmetrically disposed filter cells and separate channels communicating with each cell; valve means located between each of said filter pans and said column, each valve including means operative in response to rotation on the horizontal axis of the filter pan associated with such valve to effect communication between a certain conduit in said column and successive channels of said filter pan; fluid pump means; second valve means coacting with successive conduits of said vertical column to place said conduits in successive communication with said fluid pump means during predetermined portions of the period of revolution of the column about its vertical axis; means for rotating said column and associated filter pans about said vertical axis; said rotating means including a worm wheel carried by said vertical column, a worm coacting with said worm wheel, a housing for said worm gearing having a circular opening of larger diameter than said worm wheel and through which said worm wheel may be inserted into and removed from said housing, a bearing in said housing journalling said column for vertical axial rotation, and flanged skirt means carried by said column and projecting into said opening to seal said opening during normal operation; and means for successively rotating said filter pans about the radial horizontal axes thereof at a predetermined sector in the revolution of said column-filter pan assembly about said vertical axis.

11. In a filtering apparatus, a horizontally disposed filter pan, a shaft supporting said filter pan for rotation about its horizontal axis, a vertical column pivotally secured to one end of said shaft, a horizontally disposed arm secured to the other end of said shaft, rollers rotatably secured at each end of said arm, a circular tract concentric to said vertical column engaged by said rollers, means for imparting rotatory motion to said column to rotate the filter pan about said circular track, and means to invert the filter pan including a cam in the track engageable by the rollers at only one end of said arm.

12. In a filtering apparatus, a plurality of horizontally disposed filter pans, a shaft supporting each of said filter pans for rotation about its horizontal axis, one end of said shafts pivotally secured to a vertical column, a conduit in each of said shafts communicating with the corresponding filter pan, a wear plate on said one end of said shafts, said wear plate containing an axially opening port communicating with said conduit in said shaft, valve blocks secured to the vertical column and contacting complementary wear plates, each of said valve blocks containing a suction port positioned to register with the complementary wear plate port as the filter pan and shaft is rotated, spring means acting between each of said filter pans and said valve blocks urging the pans towards the blocks and a suction conduit in said vertical column registering with the suction ports in said valve blocks.

DANIEL M. SCHWARTZ.

References Cited in the file of this patent

UNITED STATES PATENTS

| Number | Name | Date |
|---|---|---|
| 184,427 | Riddle | Nov. 14, 1876 |
| 517,240 | Roger | Mar. 27, 1894 |
| 877,579 | Lorenz | Jan. 28, 1908 |
| 892,275 | Leslie | June 30, 1908 |
| 978,381 | Kier | Dec. 13, 1910 |
| 985,611 | Lynch | Feb. 28, 1911 |
| 1,284,346 | Howson | Nov. 12, 1918 |
| 1,284,347 | Howson | Nov. 12, 1918 |
| 1,687,863 | Graham | Oct. 16, 1928 |
| 1,757,355 | Benjamin et al. | May 6, 1930 |
| 1,765,252 | Vernay | June 17, 1930 |
| 1,778,934 | Chapman | Oct. 21, 1930 |
| 1,812,725 | Stanley et al. | June 30, 1931 |
| 1,917,818 | Woodworth | July 11, 1933 |
| 2,188,840 | McCue | Jan. 30, 1940 |
| 2,222,664 | Helle et al. | Nov. 26, 1940 |
| 2,352,330 | Lee | June 27, 1944 |
| 2,352,340 | Oswald | June 27, 1944 |
| 2,354,478 | Reinhardt | July 25, 1944 |

FOREIGN PATENTS

| Number | Country | Date |
|---|---|---|
| 297,394 | Great Britain | Apr. 11, 1929 |